Sept. 2, 1924. 1,507,055
A. H. FORGER
METHOD OF MAKING MOLDED GLASSWARE AND APPARATUS THEREFOR
Filed May 11, 1922
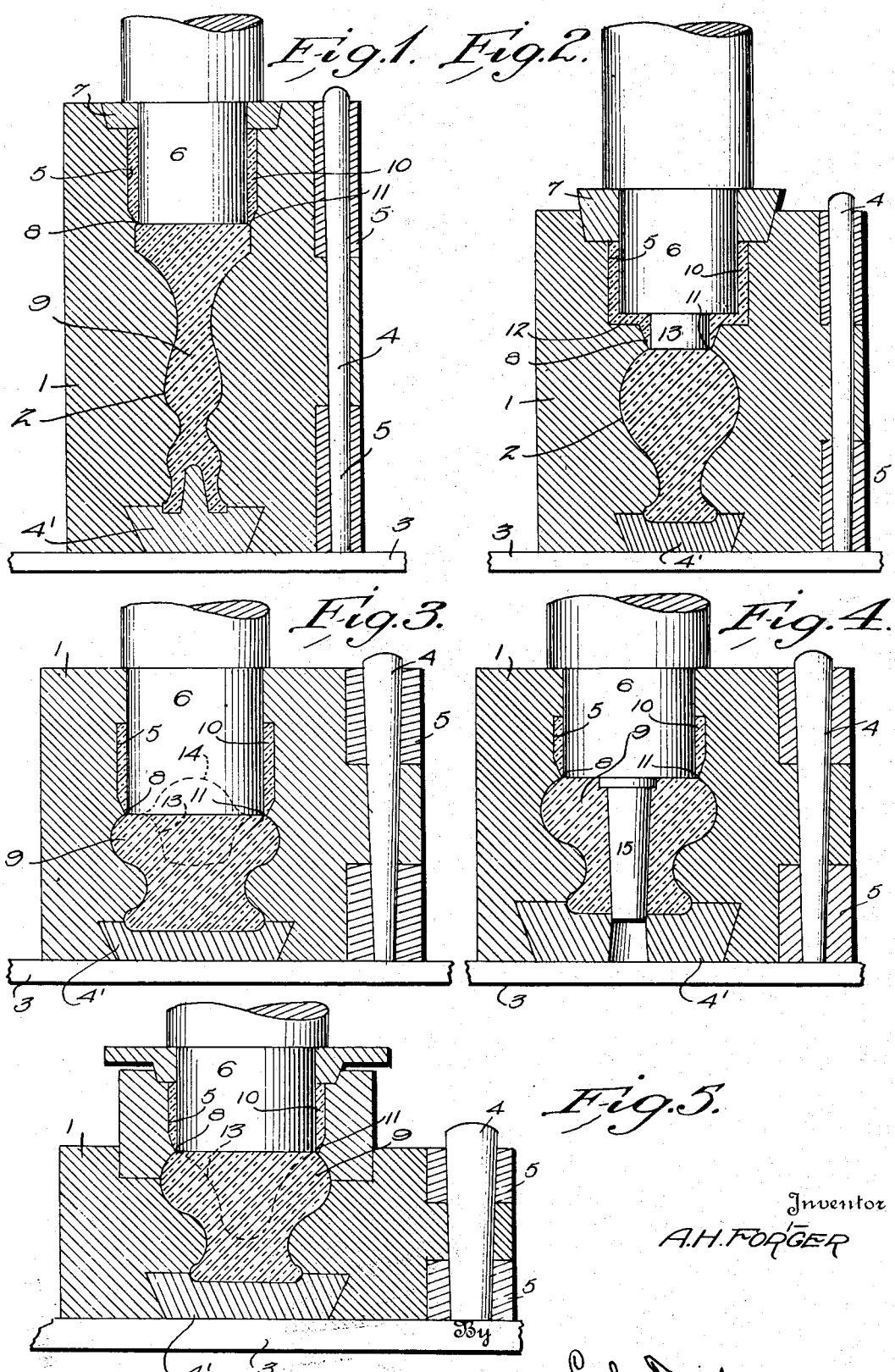

Patented Sept. 2, 1924.

1,507,055

UNITED STATES PATENT OFFICE.

ALBERT H. FORGER, OF LOS ANGELES, CALIFORNIA.

METHOD OF MAKING MOLDED GLASSWARE AND APPARATUS THEREFOR.

Application filed May 11, 1922. Serial No. 560,198.

*To all whom it may concern:*

Be it known that I, ALBERT H. FORGER, a citizen of the United States, residing at Los Angeles, in the county of Los Angeles and State of California, have invented certain new and useful Improvements in Methods of Making Molded Glassware and Apparatus Therefor, of which the following is a specification.

This invention relates to methods of making certain articles of molded glassware of such form as to require the process of manufacture generally known throughout the trade as pressing through a well or on a fount, and apparatus therefor. It comprises a process of pressing glass wherein molten glass is placed in a cup or fount and pressed downwardly through the cup to a point adjacent the top of the mold, leaving a ring of glass to be removed from the top of the article.

The invention further comprises apparatus particularly suitable for use in practicing the process, comprising a body portion or block having a mold formed therein, a cup above the mold and directly communicating therewith, and a plunger adapted to reciprocate in said cup.

The common process used in making pressed glass articles whereby the glass is dropped directly into the mold and the article is formed by the plunger coming down into the mold and forcing the glass up around it, as in making a common tumbler, cannot always be employed. Glass is not generally worked in a liquid state but is semi-fluid, about the consistency of warm taffy, and therefore cannot be poured into a mold but must be dropped in a lump. Enough glass to form such an article cannot be dropped directly into the mold through the small opening in the top. Therefore, the process heretofore employed in making a knob or similar article has been to press it through a well, which is to employ a mold structure embodying a mold, a cup or fount arranged over the mold, and a restricted passage, known as a gate, between the mold and the cup through which the glass is forced. The article molded is broken off the gate which must be kept small so that it can be easily broken or cut.

The use of a small gate is disadvantageous in several ways, and it has long been desired in the art to provide an apparatus wherein it is eliminated. When a small gate is employed, the restricted opening delays the flow of glass from the cup into the mold, and as the article produced has a section of glass formed on the top similar to the size and shape of the gate, which must be removed, any enlargement of the gate to hasten the molding process enlarges the size of the piece of glass to be removed from the top of the article, necessitating more grinding and finishing when this piece of glass is removed.

By employing a process in which the gate is enlarged and the plunger made to come down through the middle of the gate to form the top of the article molded and make a tube of the solid gate, the glass is permitted to flow free and easy into the mold, and the molding of articles of this class having tops of particular shape and design is possible.

The gate can be enlarged until it is the size of the top of the article to be made and as the plunger does not enter the gate until near the end of its stroke, the walls of the resulting tube or ring can be made very thin to facilitate breaking off the cup.

In the accompanying drawings, I have shown several types of apparatus particularly adapted for use in practicing the process. In this showing:

Figure 1 is a vertical longitudinal sectional view of a mold for use in making candle sticks, Figure 2 is a similar view of a mold for use in connection with a plunger having an offset lower end, Figure 3 is a similar view of a mold for making articles having an upper face either recessed or provided with a projecting portion, Figure 4 is a similar view of a mold for use in making an article having a central opening therein, and, Figure 5 is a view of another apparatus for use in making an article having a recessed upper face.

Referring to Figure 1 of the drawings, the reference numeral 1 designates the body portion of the mold which is provided with a central recess or opening 2 of the configuration of the article to be produced. The mold is provided with a base 3, carrying a block or member 4', adapted to close the lower end of the opening 2. The base is secured to the body by means of a pin 4, passing through side plates 5'. The upper portion of the body 1 is provided with a cup 5 of greater diameter than the diameter of the mold and this cup is adapted to receive a plunger 6, slightly smaller in diameter than the diameter of the cup. A ring 7 is arranged at the top of the cup. As shown, the walls of the cup are inclined inwardly, as indicated at 8, adjacent the bottom of the cup to produce a lower portion having a diameter barely greater than the diameter of the plunger.

In practicing the process with the apparatus disclosed in Figure 1, the molten glass is placed in the cup 5 and the plunger is forced downwardly. This forces the glass into the opening 2, filling the opening, as indicated at 9. A thin sheet of glass 10 passes up the sides of the plunger. This sheet is of sufficient thickness to retain its heat and not become chilled before the plunger reaches the bottom of the glass. The space 10 between the plunger and the cup is also thin enough to restrict the flow of glass sufficiently that the space 9 will be filled before the space 10. As the amount of glass spaced in the cup varies, the variation will, therefore, be in the cup and not in the articles made. The circular sheet of glass 10 is connected to the formed article 9 by a thinned or weakened portion 11, arranged between the plunger and the inclined wall 8 of the cup. When the operation is completed, the mold is disassembled and the article removed therefrom. The glass ring 10 is then broken off at the point 11, which leaves a very small circle on the bottom of the article to be polished and finished. It will be apparent that the elimination of a restricted passage or gate between the cup and the main opening of the mold permits the glass to be forced into the mold at a much more rapid rate of speed, thus increasing the production.

In Figure 2 of the drawings, the process is practiced in the same manner and the apparatus is essentially the same. Like reference numerals are employed to designate similar parts. In this form of the apparatus, the bottom of the cup is provided with a shoulder 12, producing a smaller passage between the cup and the main opening in the mold. The plunger is provided with a reduced end 13, adapted to enter this reduced portion of the cup. This construction allows the use of a cup of large diameter in which a lump of hot glass can be more readily placed than would be possible in a cup of the same diameter as the top of the article molded.

In Figure 3 of the drawings, there is shown a plunger suitable for use in making an article having a recess or projection on one face. The dotted lines extending through the article 9 indicate an extension 13, formed on the bottom of the plunger adapted to form a recess in the face of the article and the dotted lines 14 extending through the face of the plunger indicate a recess in the face of the plunger which will form a corresponding projection on the face of the article.

In Figure 4 of the drawings, the plunger is shown having a pin 15, projecting therefrom of sufficient length to extend through the article formed and produce a central opening therein.

Figure 5 shows a mold for producing an article of a slightly different shape from that shown in Figure 3 and provided with a projection 13 on its face to form a recess in the face of the article.

Referring particularly to the forms of the invention shown in Figures 3 to 5 of the drawings, it will be noted that an article having an irregular face, in addition to irregular side walls may be produced according to the present method, whereas in using a method having a gate between the main opening and the cup, it is impossible to produce anything other than a plain face on the side of the article adjacent the plunger.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. The method of molding solid glassware which comprises placing molten glass in a cup arranged above a mold and forcing said glass downwardly into said mold to form an article, the glass remaining in said cup being connected to said article by a thin ring.

2. The method of molding solid glassware which comprises placing molten glass in a cup arranged above a mold, forcing said glass downwardly into said mold to form an article, the glass remaining in said cup being connected to said article by a thin ring, removing the molded glass from the mold, and breaking said thin ring to separate the article from the waste glass.

3. In apparatus of the character described, a mold, a cup arranged over said mold and directly communicating therewith, the side walls of the cup being inclined inwardly adjacent the bottom to produce a portion of slightly smaller diameter than the upper portion of the cup, and a plunger adapted to reciprocate in said cup, said plunger being of substantially the same diameter as the bottom of the cup.

4. In apparatus of the character described, a mold, a cup arranged over said mold and communicating therewith, a plunger reciprocating in said cup, and means carried by said plunger for forming an irregular surface on the face of an article in said mold adjacent said cup.

In testimony whereof I affix my signature in presence of two witnesses.

ALBERT H. FORGER.

Witnesses:
CHARLES S. ROCKHILL,
HENRY FORGER.